United States Patent
Shi et al.

(10) Patent No.: US 11,412,716 B2
(45) Date of Patent: Aug. 16, 2022

(54) FLOATING INTEGRATED SYSTEM OF BREAKWATER AND WIND ENERGY FOR DEEP-SEA AQUACULTURE

(71) Applicant: Dalian University of Technology, Dalian (CN)

(72) Inventors: Wei Shi, Dalian (CN); Lixian Zhang, Dalian (CN); Dezhi Ning, Dalian (CN); Kai Wang, Dalian (CN); Tiaojian Xu, Dalian (CN); Bo Zhou, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 348 days.

(21) Appl. No.: 16/631,102

(22) PCT Filed: May 24, 2018

(86) PCT No.: PCT/CN2018/088232
§ 371 (c)(1),
(2) Date: Jan. 14, 2020

(87) PCT Pub. No.: WO2019/169742
PCT Pub. Date: Sep. 12, 2019

(65) Prior Publication Data
US 2020/0128798 A1  Apr. 30, 2020

(30) Foreign Application Priority Data
Mar. 6, 2018  (CN) .......................... 201810211963.4

(51) Int. Cl.
*A01K 61/65* (2017.01)
*F03D 9/25* (2016.01)
(Continued)

(52) U.S. Cl.
CPC .............. *A01K 61/65* (2017.01); *E02B 3/062* (2013.01); *F03D 9/25* (2016.05); *F03D 13/25* (2016.05);
(Continued)

(58) Field of Classification Search
CPC ........ A01K 61/60; A01K 61/10; A01K 61/59; F03D 9/25; F03D 13/25; F05B 2240/95; E02B 3/062
See application file for complete search history.

(56) References Cited

U.S. PATENT DOCUMENTS

| 4,716,854 A * | 1/1988 | Bourdon ................ A01K 61/00 119/3 |
| 2006/0062676 A1* | 3/2006 | Jakubowski ............ F04D 29/26 416/244 |
| 2008/0089746 A1* | 4/2008 | Jakubowski ............ E02D 27/52 405/244 |

FOREIGN PATENT DOCUMENTS

| CN | 102174802 A | 9/2011 |
| CN | 104594286 A | 5/2015 |

(Continued)

*Primary Examiner* — Joshua E Rodden
*Assistant Examiner* — Henry Hooper Mudd
(74) *Attorney, Agent, or Firm* — Muncy, Geissler, Olds & Lowe P.C.

(57) ABSTRACT

A floating breakwater and wind energy integrated system used for offshore aquaculture. The system contains the wind turbine system, the floating breakwater system, and offshore aquaculture system. The combination of wind turbine, floating breakwater system and offshore aquaculture system makes full use of the floating breakwater, thus decrease the wave load on the floating cage. In addition, the floating breakwater offers a supporting platform to the floating wind turbine, which effectively reduces the costs of the wind turbine. Meanwhile, a power autarkic offshore aquaculture system may be realized by using the electrical energy (Continued)

generated by the turbine. Compared with the simple offshore aquaculture system, the utilization rate of the sea per unit becomes even higher while the costs of the floating wind turbine becomes even lower.

2 Claims, 2 Drawing Sheets

(51) Int. Cl.
  *F03D 13/25* (2016.01)
  *E02B 3/06* (2006.01)
  *A01K 61/10* (2017.01)
  *A01K 61/59* (2017.01)
(52) U.S. Cl.
  CPC .............. *A01K 61/10* (2017.01); *A01K 61/59* (2017.01); *F05B 2240/95* (2013.01)

(56) References Cited

FOREIGN PATENT DOCUMENTS

| CN | 204570599 U | | 8/2015 | |
|---|---|---|---|---|
| CN | 106640499 A | * | 5/2017 | ............... E02B 3/06 |
| CN | 106640499 A | | 5/2017 | |
| CN | 106996359 A | * | 8/2017 | ............. A01K 61/60 |
| CN | 106996359 A | | 8/2017 | |
| CN | 107023438 A | | 8/2017 | |
| WO | WO-2013084545 A1 | | 6/2013 | |

* cited by examiner

FLOATING INTEGRATED SYSTEM OF BREAKWATER AND WIND ENERGY FOR DEEP-SEA AQUACULTURE

TECHNICAL FIELD

The present invention belongs to the technical field of marine renewable energy and marine aquaculture engineering, in particular relates to a floating integrated system of breakwater and wind energy for deep-sea aquaculture.

BACKGROUND

At present, we are in an era of energy shortage, at the same time, the utility of primary energy such as oil and coal also brings serious environmental problems. The development of new, clean and pollution-free energy has become the trend of energy development. Offshore wind energy has attracted more and more attention because of its unique advantages. At present, most of the installed offshore wind turbine in the world are traditional fixed foundation (single pile, three pile, and jacket). With the offshore wind power transferred from offshore to deep sea, the fixed foundation is not suitable for deep sea wind turbine because of its high cost. Therefore, in the future, the deep-sea wind energy will be mainly based on floating foundation. At present, the cost of deep-sea floating wind turbine is still large, and the technology of deep-sea power storage and transmission is still not very mature, which restricts the development of deep-sea floating wind turbine. With the gradual development of marine resources and aquaculture technology, deep-sea aquaculture has become an inevitable trend in the development of marine aquaculture. However, deep-sea aquaculture needs more and more energy. It is expensive to supply aquaculture with traditional power. At the same time, the wave load has an adverse effect on the structure safety of cage.

SUMMARY

The purpose of the invention is mainly to deal with the integrated utilization of offshore wind turbine and floating breakwater in view of the disadvantages of the prior art. That is to say, the floating breakwater is used as the floating foundation of the offshore wind turbine to effectively utilize the floating breakwater. The invention can effectively reduce the wave load of the cage by using the breakwater, and the electric energy generated by the wind turbine can provide electric power for aquaculture. The invention will also realize the complementary advantages of the deep-sea floating wind turbine, the floating breakwater and the deep-sea aquaculture cage system. The structure is simple in design and has high practical value. It can be widely used in deep sea aquaculture and renewable energy industry in the future.

The technical solution of the invention:

A floating breakwater and wind energy integrated system for deep sea aquaculture, including wind power generation system, floating breakwater system and deep sea aquaculture system;

the wind power generation system further comprises a wind turbine 1, a tower 2 and a power transmission system; the wind turbine 1 is a megawatt level horizontal axis wind turbine, which is connected with the floating breakwater system through the tower 2;

the floating breakwater system further comprises a plurality of boxes 3 of floating breakwater and a connecting steel rope 4 between the boxes, a plurality of box 3 of floating breakwater is connected by the connecting steel rope 4 between the boxes, and the box 3 of the floating breakwater at both ends is fixedly connected with the seabed through a tension type anchor chain 5; the main function of the floating breakwater system is to dissipate the wave and stabilize the water flow, so as to prevent the excessive wave from damaging the cage system; the box 3 of the floating breakwater is equipped with ballast water to reduce the center of gravity of the floating breakwater system and keep it stable; the box 3 of the floating breakwater also provides a support platform for the wind turbine 1; the deep sea aquaculture system includes a circular cultivation cage 6, an anchor buoy 7, a vertical anchor chain 8 with a weight block, a vertical anchor chain 9 and a positioning anchor chain 10; the circular cultivation cage 6 is provided with the required vertical force by the anchoring buoy 7, each of which is fixed on the sea floor by a vertical anchor chain 9, and the circular cultivation cage 6 is fixed on the sea floor by the positioning anchor chain 10; the bottom of each circular cultivation cage 6 is connected with eight vertical anchor chains with weight blocks, which are evenly distributed at an interval of 45 degrees, so as to limit its excessive movement under the action of current and fish; in circular cultivation cage 6, there are fish, crabs and other seafood; the power supply of circular cultivation cage 6 is mainly provided by wind power generation system.

The beneficial effects of the present invention: the innovation of the present invention is the combination of the wind turbine, the floating breakwater and the offshore cages, which makes full use of the floating breakwater so as to decrease the wave load on the floating cage. In addition, the floating breakwater equals to a support platform structure for the floating turbine, which effectively reduce the costs. Meanwhile, a power autarkic offshore aquaculture system may be realized by using the electrical energy generated by the offshore wind turbine. Compared with the simple offshore aquaculture system, the utilization rate of the sea per unit is higher while the costs of the floating turbine becomes lower. The economic advantage of the present invention is illustrated, not only realizing the power autarkic offshore aquaculture system but also a simple apparatus structure of high practical value.

In the figures: 1 wind turbine, 2 tower, 3 box of the floating breakwater, 4 connecting steel rope between boxes, 5 tension type anchor chain, 6 circular aquaculture cage, 7 anchoring buoy, 8 vertical anchor chain with a weight block, 9 vertical anchor chain, 10 positioning anchor chain.

DETAILED DESCRIPTION

Hereinafter, the present invention is further explained in combination with the drawings and specific embodiments.

Figure 1:
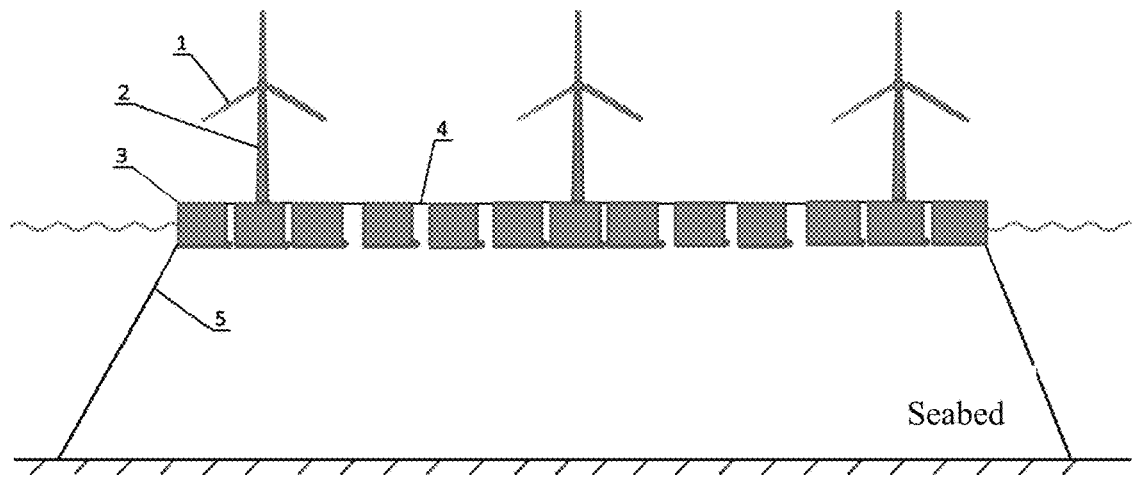
FIG. 1 illustrates a front view of the integrated structure of wind turbine and floating breakwater.
Figure 2:
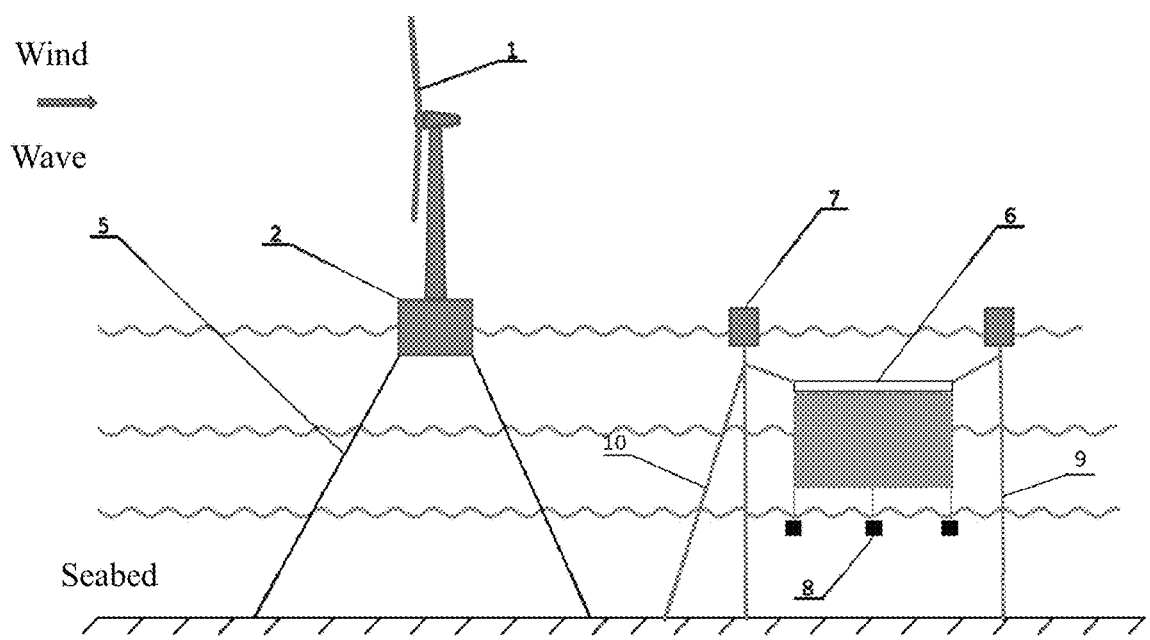
FIG. 2 illustrates a side view of the structure arrangement.

As shown in FIG. 1 and FIG. 2, a floating breakwater used for offshore aquaculture and wind energy integrated system contains the wind turbine system, the floating breakwater system and the offshore aquaculture system. The upper wind turbine 1 is attached to the box 3 of the floating breakwater. The boxes 3 of floating breakwater are connected by the connecting steel rope 4 between the boxes and are connected with the seabed by the tension type anchor chain 5. The circular aquaculture cage 6 is arranged right behind the floating breakwater, which is connected with the anchor buoy 7 that provides buoyancy by the steel rope. The weight blocks are arranged right below the circular aquaculture cage 6, aiming to lower the gravity and stabilize the circular aquaculture cage 6. The main materials of weight blocks may be concrete fixed ballast, ore fixed ballast, or sand fixed ballast.

The wind turbines 1 are arranged in an orderly manner and at a distance from each other (see FIG. 1), aiming to prevent interference between the turbines which may affect the electrical generation efficiency. The floating breakwater is mainly comprised of multiple single structure, each single structure is connected by steel rope with each other. The boxes of the floating breakwater of the two sides is connected to the seabed by tension type anchor chain 5. The boxes 3 of the floating breakwater are filled with ballast water, aiming to lower the gravity and stabilize the floating boxes.

Figure 3:
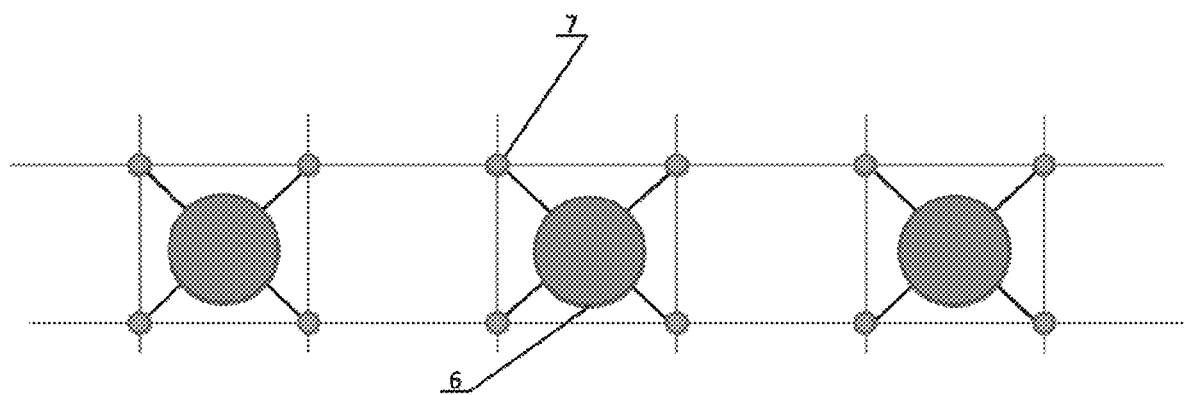
FIG. 3 illustrates a top view of the distribution of the aquaculture cage.

The circular aquaculture cages 6 are arranged in a plurality of rows with a space from each other (see FIG. 3), different circular aquaculture cages 6 are connected by connecting steel rope 4 so as to form the cluster system.

During the period of onshore assembly, the box 3 of the floating breakwater contains no ballast water. The whole floating breakwater system may provide buoyancy for the wind turbine 1 that is light-draft. When the wind turbine 1 is operating normally, the box 3 of the floating breakwater contains ballast water, reaching the standard draught depth and lowering the gravity so as to improve the stability of the wind turbine 1 and fulfill the wave absorption function of the floating breakwater which provides stable water area environment for the circular aquaculture cage 6.

During the operation process of the present method, the upper wind turbine 1 is aligned with the wind direction by the yaw device so that the blades rotate may generate electrical energy under the actions of wind. The electrical energy is partially used for the use of needs of the circular aquaculture cage 6 itself which the rest of the electrical energy may be transmitted to the land. The floating breakwater may protect the circular aquaculture cage 6 from the wave loads as providing a stable water area environment for the circular aquaculture cage 6 and a floating basis for the wind turbine 1 in the process of deep sea power generation. The circular aquaculture cage 6 adopts a fully submerged cage, which may effectively protect the circular aquaculture cage 6 from the damage due to the fast wind speed. Meanwhile, in order to avoid the shaking that may affect the circular aquaculture cage 6, the weight blocks are added at the bottom to lower the gravity and ensure the stability of the circular aquaculture cage 6. Moreover, the floating breakwater is connected with the seabed by the tension type anchor chain 5, maintaining the stability of the floating breakwater and the wind turbine 1.

The invention claimed is:

1. A floating breakwater and wind energy integrated system for deep sea aquaculture, comprising a combination of wind power generation system, floating breakwater system and deep sea aquaculture system;
    the wind power generation system further comprises a wind turbine, a tower and a power transmission system; the wind turbine 1 is a megawatt level horizontal axis wind turbine, which is connected with the floating breakwater system through the tower;
    the floating breakwater system further comprises a plurality of boxes of floating breakwater and connecting steel rope between the boxes, the plurality of boxes of floating breakwater is connected by the connecting steel rope between the boxes, and the boxes of the floating breakwater at both ends is fixedly connected with a seabed through a tension type anchor chain; the main function of the floating breakwater system is to dissipate a wave and stabilize water flow, so as to prevent an excessive wave from damaging a deep sea aquaculture system; the boxes of the floating breakwater are equipped with ballast water to reduce the center of gravity of the floating breakwater system and keep it stable; the boxes of the floating breakwater also provide a support platform for the wind turbine;
    the deep sea aquaculture system includes a circular cultivation cage, an anchor buoy, a plurality of first vertical anchor chains with a weight block, a second vertical anchor chain and a positioning anchor chain; the circular cultivation cage is provided with a required vertical force by anchoring buoy, each of which is fixed on the sea floor by the second vertical anchor chain, and the circular cultivation cage is fixed on the sea floor by the positioning anchor chain; the bottom of each circular cultivation cage is connected with eight of the plurality of first vertical anchor chains with weight blocks, which are evenly distributed at an interval of 45 degrees, so as to limit its excessive movement under action of current and fish; the power supply of circular cultivation cage is mainly provided by wind power generation system.

2. The floating breakwater and wind energy integrated system according to claim 1, wherein materials of ballast are concrete, ore sand, or sandstone.

* * * * *